(12) United States Patent
Kaartinen et al.

(10) Patent No.: US 11,003,435 B2
(45) Date of Patent: May 11, 2021

(54) MANIFEST TRIALING TECHNIQUES

(71) Applicants: Arm Limited, Cambridge (GB); Arm IP Limited, Cambridge (GB)

(72) Inventors: Mika Jere Petteri Kaartinen, Oulu (FI); Brendan James Moran, Histon (GB)

(73) Assignees: Arm Limited, Cambridge (GB); Arm IP Limited, Cambridge (GB)

( * ) Notice: Subject to any disclaimer, the term of this patent is extended or adjusted under 35 U.S.C. 154(b) by 62 days.

(21) Appl. No.: 16/375,814

(22) Filed: Apr. 4, 2019

(65) Prior Publication Data
US 2020/0319873 A1    Oct. 8, 2020

(51) Int. Cl.
| | |
|---|---|
| G06F 9/445 | (2018.01) |
| H04L 29/08 | (2006.01) |
| G06F 8/65 | (2018.01) |
| G06F 9/44 | (2018.01) |
| H04L 29/06 | (2006.01) |
| G06F 11/14 | (2006.01) |
| G06F 8/61 | (2018.01) |

(52) U.S. Cl.
CPC ............ *G06F 8/65* (2013.01); *G06F 8/61* (2013.01); *G06F 11/1433* (2013.01); *H04L 67/34* (2013.01)

(58) Field of Classification Search
CPC . H04L 67/28; H04L 67/2852; H04L 67/2847; H04L 67/34; H04L 67/02; H04L 67/42; H04L 67/10; G06F 16/951; G06F 8/71; G06F 8/65; G06F 8/41; G06F 8/61; G06F 8/60; G06F 8/20; G06F 9/45558; G06F 21/32; G06F 11/1433; G06Q 50/01
See application file for complete search history.

(56) References Cited

U.S. PATENT DOCUMENTS

| | | | |
|---|---|---|---|
| 10,534,581 B2 * | 1/2020 | Hollands | G06F 8/61 |
| 10,732,954 B2 * | 8/2020 | Bala | G06F 8/65 |
| 2020/0065132 A1 * | 2/2020 | Mercier | G06F 9/45558 |

FOREIGN PATENT DOCUMENTS

GB    2542127 A    3/2017

OTHER PUBLICATIONS

Rehman et al., A Framework for User Feedback Based Cloud Service Monitoring, 6 pages (Year: 2012).*
ARM IP Limited; GB 1717204.0; Filed Oct. 19, 2017.
Moran, et al.; A Firmware Update Architecture for Internet of Things Devices; IETF; Mar. 27, 2019.
Moran, et al.; SUIT CBOR manifest serialisation format; IETF; Mar. 11, 2019.
Moran, et al.; Firmware Updates for Internet of Things Devices— An Information Model for Manifests; IETF; Jan. 18. 2019.

\* cited by examiner

*Primary Examiner* — Thuy Dao
(74) *Attorney, Agent, or Firm* — Pramudji Law Group PLLC; Ari Pramudji (57) ABSTRACT

Various implementations described herein are directed to a method for acquiring a manifest having a trial flag with a status indicator and providing the manifest to a plurality of devices. The status indicator may inform the plurality of devices to provide update acceptability reports. The method may include receiving the update acceptability reports from the plurality of devices and determining an update deployment rate based on the update acceptability reports received from the plurality of devices. The method may include deploying the update in accordance with the update deployment rate.

9 Claims, 6 Drawing Sheets

MANIFEST TRIALING TECHNIQUES

BACKGROUND

This section is intended to provide information relevant to understanding the various technologies described herein. As the section's title implies, this is a discussion of related art that should in no way imply that it is prior art. Generally, related art may or may not be considered prior art. It should therefore be understood that any statement in this section should be read in this light, and not as any admission of prior art.

In some instances, when a cloud update is executed for a large fleet of devices, it may be possible that there are some devices in the fleet that may not accept and deploy the update at a time when an update campaign is run. Some failures may include multiple reasons that vary, e.g., from temporarily out of storage space to planned network outages, and the failure of the update on such devices may only be noticed during or after running the update campaign from the cloud. For the failing devices, one or multiple new update campaigns may need to be executed to get the update working, which can be inefficient, inconvenient and difficult to implement universally in some devices.

BRIEF DESCRIPTION OF THE DRAWINGS

Implementations of various techniques are described herein with reference to the accompanying drawings. It should be understood, however, that the accompanying drawings illustrate only various implementations described herein and are not meant to limit embodiments of various techniques described herein.

DETAILED DESCRIPTION

Various implementations described herein refer to and are directed to manifest trialing schemes and techniques for update deployment between a server and a plurality of remote devices. For instance, the various schemes and techniques described herein refer to a mechanism of manifest trialing for software updates, wherein a manifest may be used to acquire and distribute content in a client cloud network. Thus, in some instances, the mechanism described herein may be used to query Internet of things (IoT) device(s) in situations where a manifest is applicable to the IoT device(s) without running an actual update (e.g., software update) to the IoT devices(s). If the manifest is not applicable, then the IoT device(s) may report failing parameters to the client cloud network. Also, the update mechanism may be based on manifest(s) that specify and carry data, keys and/or information needed to perform an update (e.g., software update) on a large fleet of IoT devices. In some instances, software updates may refer to Software Updates for Internet of Things (SUIT) updates.

To overcome deficiencies of conventional techniques, various implementations described herein provide for manifest trialing techniques that query client device(s) so as to determine whether the manifest in an update campaign is acceptable by the client device(s). Manifest trialing works with one or more of the following techniques. For instance, when an update campaign is created in a cloud network, and before starting the update campaign, an associated manifest may be sent to the client devices with a trial parameter set. When the client devices receive the manifest with the trial parameter set, the client devices may parse the manifest, extract the manifest's parameters, and then report back to the cloud if the client device can be updated using this manifest. The actual update is not started based on this trialing manifest. In this instance, the update campaign creation phase may be able to determine how many of the client devices are able to be updated with this manifest and how many are not, and some client devices may provide reasons for failure to accept the manifest. Also, based on this response feedback from the fleet of client devices, parameters of the manifest may be modified, and a new manifest having modified parameters may be uploaded to the cloud even before the update campaign is started. This way, cloud update campaigns may be run more efficiently so as to improve an update deployment rate. Thus, the SUIT manifest may be designed to be small and lightweight so as to be efficiently transferred to a large fleet of client devices that may have reduced connectivity and/or processing power. For this reason, manifest trialing provides for more efficient update campaigns.

Various implementations of providing manifest trialing schemes and techniques will now be described in detail herein with reference to FIGS. 1-6.

Figure 1:
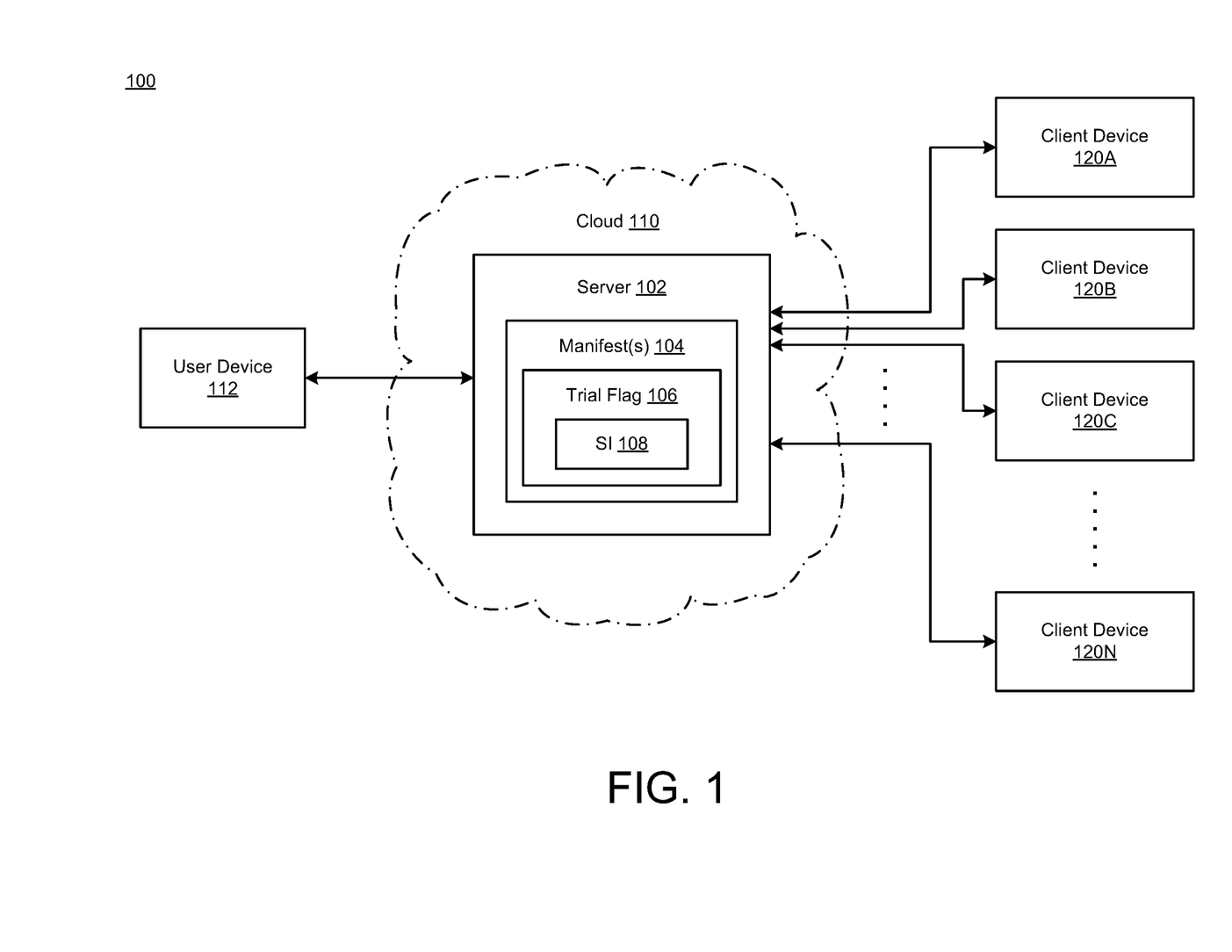
FIG. 1 illustrates a block diagram of a system for providing a manifest trialing technique in accordance with various implementations described herein.

FIG. 1 illustrates a diagram of a system 100 for providing a manifest trialing scheme and technique in accordance with implementations described herein.

As shown in FIG. 1, the system 100 may include a server 102 or similar apparatus in communication with a number (N) of client devices 120A, 120B, 120C, . . . , 120N via a cloud 110 or similar network for implementing manifest trialing schemes and techniques with various methods associated therewith. The number (M) of devices may include any number of devices. The server 102 may be configured for deployment of an update, such as, e.g., software update, to the plurality of client devices 120A, 120B, 120C, . . . , 120N. Various methods described herein may be performed by the server 102 having capability to communicate with one or more of the client devices 120A, 120B, 120C, . . . , 120N, and the client devices 120A, 120B, 120C, . . . , 120N may refer to one or more or a fleet of remote devices that are separate and disposed away (or remotely) from the server 102.

The server 102 may implement a SUIT update mechanism that is based on one or more manifests that specify and carry data, keys and/or information needed to perform an update (e.g., software update) on the client devices 120A, 120B, 120C, . . . , 120N, such as, e.g., a fleet of remote devices including IoT devices. In various instances, the data, keys and information in the manifest may include encryption keys and hashes, sizes, signatures, payload URIs (uniform resource identifiers), pre-conditions, post-conditions, predirectives, post-directives and/or various related information that may be associated with installation parameters for scheduling updates. The SUIT manifest may be designed as light-weight and meant to be well-suited for large fleets of constrained devices.

In some implementations, the server 102 may acquire one or more manifests 104 with each manifest 104 having a trial flag 106 with a status indicator (SI) 108. The server 102 may provide the one or more manifests 104 to the client devices 120A, 120B, 120C, . . . , 120N, and the status indicator 108 informs the client devices 120A, 120B, 120C, . . . , 120N to provide one or more update acceptability reports. The server 102 may receive the one or more update acceptability reports from the client devices 120A, 120B, 120C, . . . , 120N. The server 102 may determine an update deployment rate based on the one or more update acceptability reports received from the client devices 120A, 120B, 120C, . . . , 120N. Also, after determining the update deployment rate, the server 102 may deploy the update (software update) to the client devices 120A, 120B, 120C, . . . , 120N in accordance with the update deployment rate.

In various instances, the status indicator (SI) may be a bit field or some type of attribute of the manifest. Also, in some instances, the trial flag may be used to indicate to a device as to whether or not the manifest is to be executed and/or installed, or at least trialled to determine acceptability by the device.

In some instances, the one or more manifests 104 may include a first manifest having the trial flag 106 with the status indicator 108 as a first status indicator. As such, in this instance, if the update deployment rate is greater than or equal to a threshold, then the server 102 may provide the manifest 104 as the first manifest having the trial flag 106 with the status indicator 108 as a second status indicator that informs the client devices 120A, 120B, 120C, . . . , 120N to install the manifest 104 as the first manifest. Also, if the update deployment rate is less than the threshold, then the server 102 acquires another manifest 104 as a second manifest having modified parameters associated with the first manifest so as to increase the update deployment rate. Further, the server 102 provides the second manifest to the client devices 120A, 120B, 120C, . . . , 120N, and the second manifest has the trial flag 106 with the second status indicator 108 that informs the client devices 120A, 120B, 120C, . . . , 120N to install the second manifest.

In some instances, the one or more manifests 104 (including the first manifest and the second manifest) are universal update files for installation on the client devices 120A, 120B, 120C, . . . , 120N. The first manifest and the second manifest may be digital content manifests, and the trial flag 106 may refer to a trialing parameter that is set with the status indicator (SI) 108, such as, e.g., the first status indicator or the second status indicator. The one or more manifests 104 including, e.g., the first manifest and the second manifest, may have a digital security mechanism used by the client devices 120A, 120B, 120C, . . . , 120N to authenticate (or authorize) the first manifest and the second manifest. The trial flag 106 informs the client devices 120A, 120B, 120C, . . . , 120N to install the first manifest or the second manifest based on the first status indicator or the second status indicator, and the second status indicator is different than the first status indicator.

In some instances, the universal update file may indicate that the manifest can be interpreted and used by more than one device type to determine how the update should be executed. In other instances, the universal update files may refer to one or multiple manifests, which may refer to any type of update content, such as, e.g., update firmware, update data, update configuration data, and/or similar. In other instances, the universal update file may include at least one of (1) zero or more blocks of authentication data, (2) one or more update metadata blocks, and (3) zero or more update data blocks.

In some instances, the update deployment rate may refer to a level of update compliance from the client devices 120A, 120B, 120C, . . . , 120N, and in this instance, the level of compliance may refer to feedback responses related to acceptance or failure of installing the first manifest or the second manifest by the client devices 120A, 120B, 120C, . . . , 120N. Also, in some instances, the update acceptability reports may refer to one or more compatibility checks performed by the client devices 120A, 120B, 120C, . . . , 120N, and the update acceptability reports may include various compatibility results that may refer to a level of update compliance and/or update compatibility from the client devices 120A, 120B, 120C, . . . , 120N.

In reference to FIG. 1, the server 102 may be implemented as a computing apparatus purposed for manifest trialing schemes and techniques, thereby transforming the server 102 into a special purpose machine dedicated to implementation of manifest trialing schemes and techniques, as described herein. Thus, the server 102 may include standard element(s) and/or component(s), including at least one processor, memory (e.g., non-transitory computer-readable storage medium), peripherals, power, and various other computing elements and/or components that are not specifically shown in FIG. 1. The server 102 may be associated with a user device 112 (e.g., user computing device) that may be used to provide a graphical user interface (GUI). In some instances, the GUI may be used to receive parameter input from a user (e.g., user input) associated with manifest trialing schemes and techniques. In other instances, various other user interfaces (UI) (e.g., keyboard, camera, microphone, or similar) may be used to receive user parameter input associated with manifest trialing schemes and techniques. The server 102 may also be associated with one or more databases or other similar memory devices that may be configured to store and/or record data and information related to the user and/or manifest trialing schemes and techniques described herein.

As such, the server 102 may include a processor and instructions stored or recorded on a non-transitory computer-readable medium (e.g., memory, database, or the like) that are executable by the processor. The server 102 may communicate with the user device 112 for receiving input from a user and for providing output to a user. In some instances, additional user devices may be used for receiving input from one or more other users and providing output to the one or more other users.

Also, in reference to FIG. 1, the server 102 is shown using various functional blocks or modules that represent discrete functionality. However, it should be understood that such illustration is provided for clarity and convenience, and therefore, it should be appreciated that the various functionalities may overlap or be combined within a described block(s) or module(s), and/or may be implemented by one or more additional block(s) or module(s) that are not specifically illustrated in FIG. 1. Further, it should be understood that various standard and/or conventional functionality that may be useful to the server 102 of FIG. 1 may be included as well even though such standard and/or conventional elements are not illustrated explicitly, for the sake of clarity and convenience.

Figure 2:
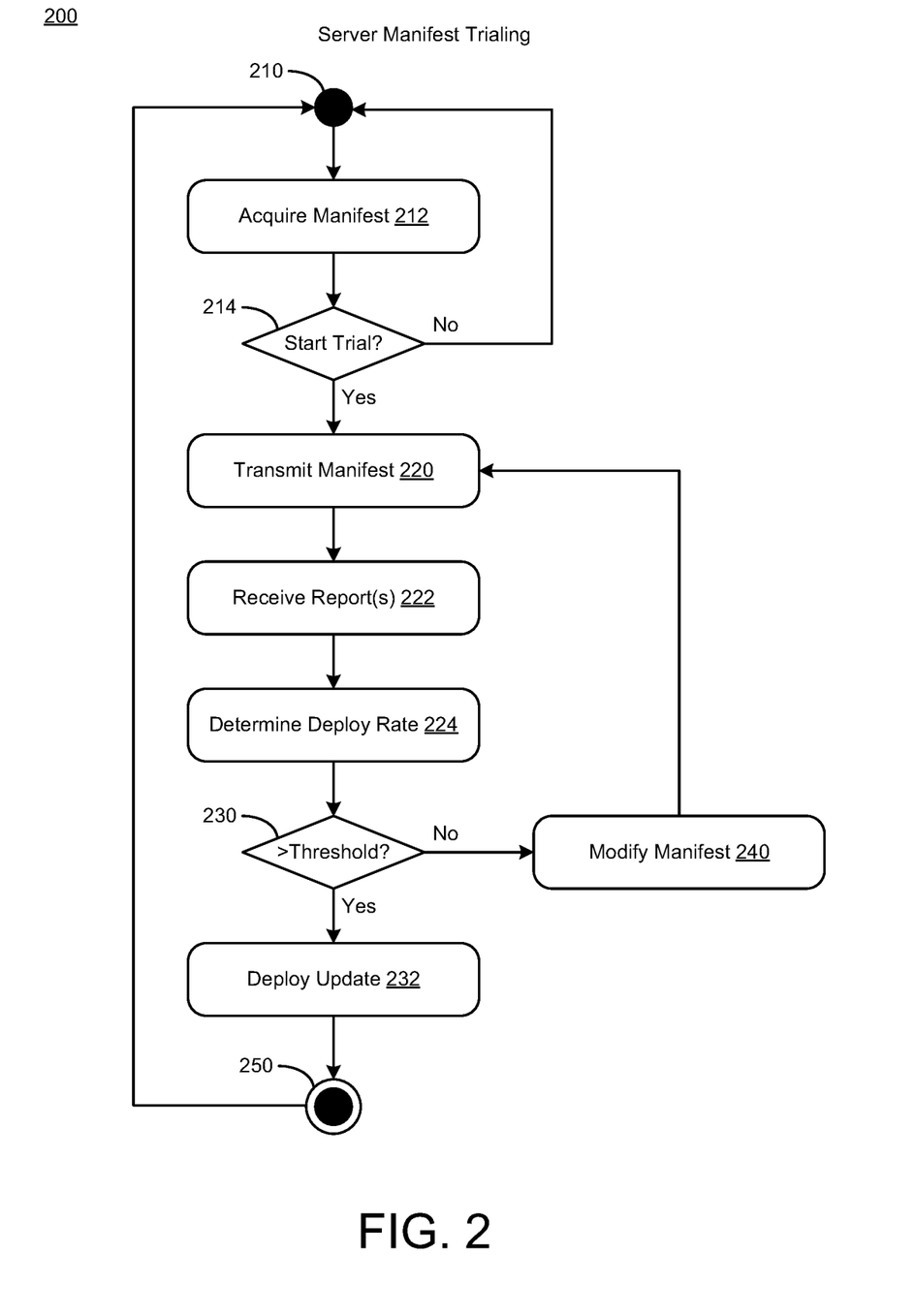
FIG. 2 illustrates a process diagram of a method for server manifest trialing in accordance with implementations described herein.

FIG. 2 illustrates a process flow diagram of a method 200 for server manifest trialing in accordance with implementations described herein.

It should be understood that even though method 200 may indicate a particular order of operation execution, in some cases, various certain portions of operations may be executed in a different order, and on different systems. In some other cases, additional operations and/or steps may be added to and/or omitted from method 200. Method 200 may be implemented in hardware and/or software. If implemented in hardware, method 200 may be implemented with various components, such as described herein above in reference to FIG. 1. If implemented in software, method 200 may be implemented as a program or software instruction process that may be configured for implementing various manifest trialing schemes and techniques as described herein. Further, if implemented in software, various instructions related to implementing method 200 may be stored in memory, wherein a computer, a server, or various other computing devices having a processor and memory may be configured to perform method 200.

In reference to FIG. 2, method 200 may be utilized for implementing various manifest trialing schemes and techniques. In some implementations, method 200 may be performed by a server (e.g., server 102 in FIG. 1) having capability to communicate with a plurality of devices (e.g., client devices 120A, 120B, 120C, . . . , 120N of FIG. 1), and method 200 may be used for deployment of an update (e.g., software update) to the plurality of devices that may be referred to as a fleet of remote devices.

From initial block 210, method 200 may proceed to block 212, wherein method 200 may acquire a manifest (e.g., a first manifest) having a trial flag with a status indicator (e.g., a first status indicator). The manifest refers to a universal update file for installation on the plurality of devices. In some instances, the manifest is a digital content manifest, and the trial flag is a trialing parameter that is set with the status indicator. The trial flag informs the plurality of devices to install the manifest based on the status indicator. Also, the manifest may have a digital security mechanism that is used by the plurality of devices to authenticate the manifest.

At decision block 214, method 200 may determine whether to start a trial, such as, e.g., a manifest trialing campaign, for the plurality of devices in a cloud (e.g., a cloud network, such as the cloud 110 in FIG. 1). If no, then method 200 may return to initial block 210. If yes, then method 200 may proceed to block 220.

At block 220, method 200 may provide (or transmit) the manifest to the plurality of devices, and the status indicator may inform the plurality of devices to provide one or more update acceptability reports, e.g., as feedback, to the server.

At block 222, method 200 may receive the one or more update acceptability reports from the plurality of devices. In some instances, the update acceptability reports may refer to one or more compatibility checks performed by the plurality of devices, and the update acceptability reports include compatibility results that refer to a level of update compliance and update compatibility from the plurality of devices.

At block 224, method 200 may determine an update deployment rate based on the one or more update acceptability reports received from the plurality of devices. Also, in some instances, the update deployment rate may refer to a level of update compliance from the plurality of devices, and the level of compliance may refer to feedback responses related to acceptance or failure of installing the manifest by the plurality of devices.

At decision block 230, method 200 may decide whether the update deployment rate is greater than (>) a threshold. If yes, then method 200 may proceed to block 232 to deploy the update in accordance with the update deployment rate. If no, then method 200 may proceed to block 240.

At block 232, if the update deployment rate is greater than or equal (> or =) to the threshold, then method 200 may provide the first manifest having the trial flag with the second status indicator that informs the plurality of devices to install the first manifest. In this instance, method 220 may then proceed to ending block 250 to either terminate the process flow or wait for another manifest trialing campaign. The second status indicator is different than the first status indicator.

At block 240, method 200 may modify the manifest to acquire another manifest (as a second manifest) having modified parameters associated with the initial manifest (as a first manifest). Thus, the initial manifest may refer to a first manifest having the trial flag with the status indicator as a first status indicator, and the modified manifest may refer to a second manifest having the trial flag with the status indicator as a second status indicator. In this instance, at block 240, if the update deployment rate is less than (<) the threshold, then method 200 acquires the second manifest having modified parameters associated with the first manifest so as to increase the update deployment rate. Also, from block 240, method 200 may return to block 220 to provide the second manifest to the plurality of devices for deployment of the update.

In some instances, referring to the second manifest, method 200 may reiterate blocks 222, 224, 230 to determine another (or second) update deployment rate and then decide whether to deploy the second manifest in block 232 or modify the second manifest at block 240 to further improve the update deployment rate. Thus, in some instances, at block 232, method 200 may provide the second manifest to the plurality of devices, and the second manifest may have the trial flag with the second status indicator that informs the plurality of devices to install the second manifest. From block 250, method 200 may then proceed to ending block 250 to either terminate the process flow or wait for another manifest trialing campaign.

Figure 3:
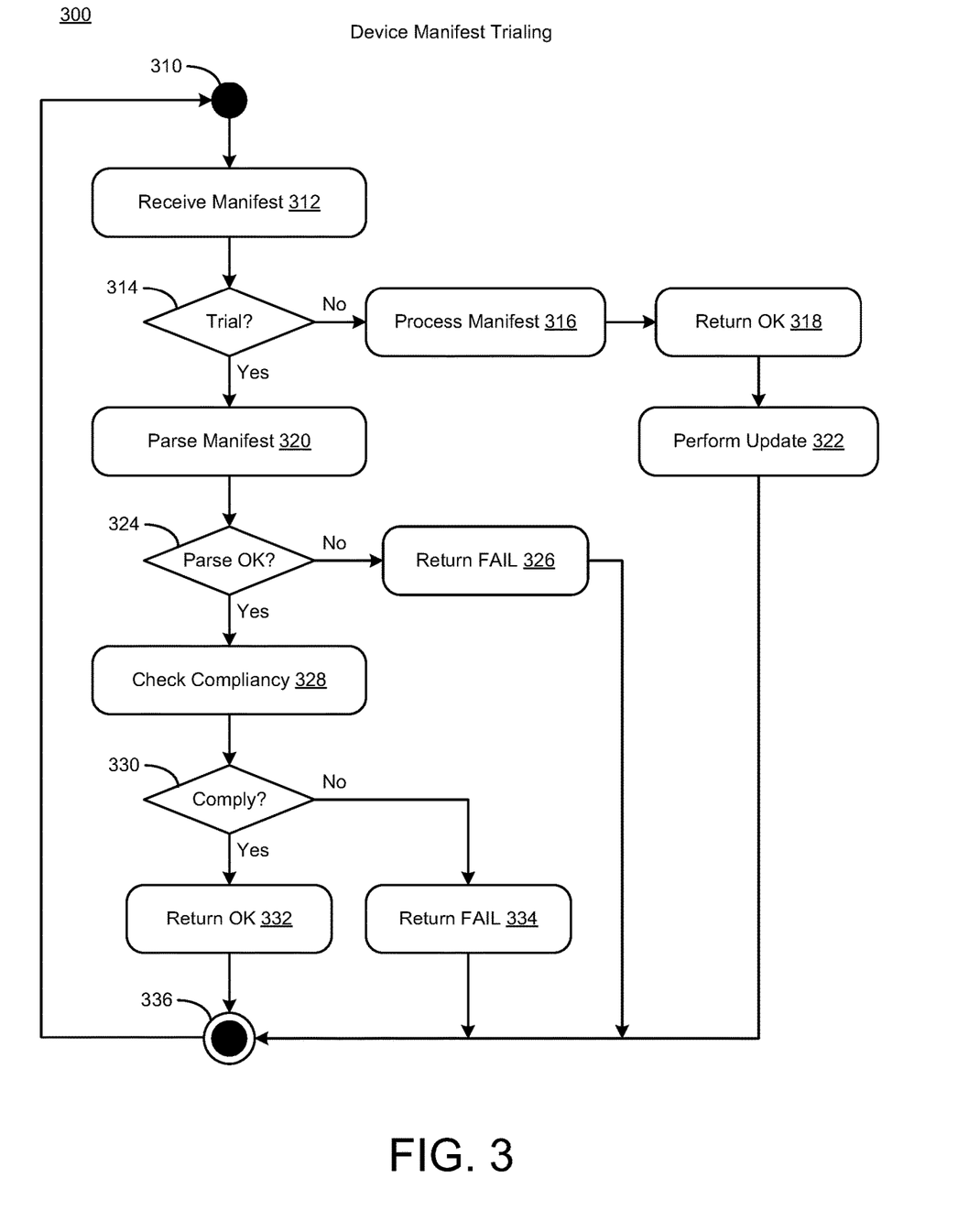
FIG. 3 illustrates a process diagram of a method for device manifest trialing in accordance with implementations described herein.

FIG. 3 illustrates a process flow diagram of a method 300 for device manifest trialing in accordance with implementations described herein.

It should be understood that even though method 300 may indicate a particular order of operation execution, in some cases, various certain portions of operations may be executed in a different order, and on different systems. In some other cases, additional operations and/or steps may be added to and/or omitted from method 300. Method 300 may be implemented in hardware and/or software. If implemented in hardware, method 300 may be implemented with various components, such as described herein above in reference to FIG. 1. If implemented in software, method 300 may be implemented as a program or software instruction process that may be configured for implementing various manifest trialing schemes and techniques as described herein. Further, if implemented in software, various instructions related to implementing method 300 may be stored in memory, wherein a computer, a server, or various other computing devices having a processor and memory may be configured to perform method 300.

In reference to FIG. 3, method 300 may be utilized for implementing various manifest trialing schemes and techniques. In some implementations, method 300 may be performed by a remote device (e.g., client devices 120A, 120B, 120C, . . . , 120N in FIG. 1) having capability to communicate with a server (e.g., server 102 of FIG. 1), and method 300 may be used for deployment of an update (e.g., software update) from the server that may be referred to as a cloud server.

From initial block 310, method 300 may proceed to block 312, wherein method 300 may receive a manifest (e.g., a first manifest) from a server (e.g., server 102 of FIG. 1), wherein the manifest may include a trial flag with a status indicator (e.g., a first status indicator). The manifest may refer to a universal update file for installation on the remote device. In some instances, the manifest is a digital content manifest, and the trial flag is a trialing parameter that is set with the status indicator, wherein the trial flag informs the remote device to install the manifest based on the status indicator. In other instances, the manifest may include a digital security mechanism that is used by the remote device to authenticate the manifest.

At decision block 314, method 300 may determine whether to implement a trial, such as, e.g., a manifest trialing campaign, provided by a server in a cloud (e.g., a cloud network, such as the cloud 110 in FIG. 1). If no, then method 300 may proceed to block 316. If yes, then method 300 may proceed to block 320.

At block 316, method 300 may process the manifest and then proceed to block 318. In this instance, at block 318, method 300 returns an OK to the server, wherein the remote device accepts the manifest for deployment of an update (e.g., software update) from the server in the cloud. Then, at block 322, method 300 may perform the update in a manner prescribed by the manifest. Once the update is performed by the remote device, method 300 may proceed to ending block 336 to either terminate the process flow or wait for another manifest trialing campaign.

At block 320, method 300 may parse the manifest to extract the trial flag and to determine a state of the status indicator, wherein the state refers to a first state or a second state. At decision block 324, method 300 may determine whether the parse is OK. If no, then method 300 may return a FAIL to the server, wherein the remote device does not accept the manifest for deployment of the update (e.g., software update) from the server in the cloud. If yes, then method 300 may proceed to block 328.

At block 328, method 300 may check compliancy of the manifest. At decision block 330, method 300 may determine whether the manifest is in compliance. If no, then at block 334, method 300 may return a FAIL to the server, wherein for various reasons, the remote device does not accept the manifest for deployment of the update (e.g., software update) from the server in the cloud. Some examples of various error values and/or return values are provided herein below. If yes, then method 300 may proceed to block 332. In this instance, at block 332, method 300 installs the manifest on the remote device, and also, the remote device may then accept the manifest for deployment of the update (e.g., software update) from the server in the cloud. Then, from block 332, method 300 may proceed to ending block 336 to either terminate the process flow or wait for another manifest trialing campaign.

As described herein above, at blocks 332 or 334, method 300 may return OK or FAIL to the server in reference to manifest compliance. In various implementations, the following feedback responses may be used in reference to acceptance and failures including error and/or return values. For instance, return values for a trial post campaign may include one or more of the following:

2.00 OK: The manifest defines update parameters that may be implemented by the client device.

4.01 FAIL: Unauthorized, wherein the fingerprint/certificates/signature in the manifest may not be implemented by the client device. In various implementations, the failure mode may be a signature verification failure.

4.02 FAIL: Bad Option, wherein there were one or more options in the manifest that could not be accepted by the client device.

4.03 FAIL: Security Algorithm not supported by the client device.

4.04 FAIL: URI (Uniform Resource Identifier) was not found, wherein the client device could not resolve the URI defined in the manifest.

4.05 FAIL: Permission(s) for the Requested action(s) not allowed AND/OR the necessary authorship/qualification rights not authenticated.

4.06 FAIL: Encryption Algorithm not supported by the client device.

4.07 FAIL: Compression Algorithm not supported by the client device.

4.08 FAIL: Rollback protection—cannot apply older software version.

4.09 FAIL: Missing manifest dependency—the client device cannot comply to dependency requirements.

4.10 FAIL: Client device temporarily unavailable to perform manifest trialing.

4.11 FAIL: Manifest Vendor, Model, Class and/or Hardware Id (or other identity information) not matching the client device identities.

4.12 FAIL: Update installation mechanism not supported.

4.13 FAIL: Request Entity too large, wherein the payload size defined in the manifest cannot be accepted by the client device.

4.14 FAIL: Update installation schedule conditions cannot be implemented by the client device.

4.15 FAIL: Update Payload format not supported by the client device.

4.16 FAIL: Storage Identifier not supported by the client device.

4.17 FAIL: Storage location not supported by the client device.

4.18 FAIL: Component Identifier not supported by the client device.

4.19 FAIL: Precursor image version not matched by the client device and/or precursor image cannot be accessed.

4.20 FAIL: Manifest directives cannot be matched by the client device.

4.21 FAIL: Manifest format invalid and/or not supported by the client device.

4.22 FAIL: No matching relocation address.

4.23 FAIL: No relocation table.

4.24 FAIL: Manifest tree depth too deep.

4.25 FAIL: Too many manifests in update.

Figure 4:
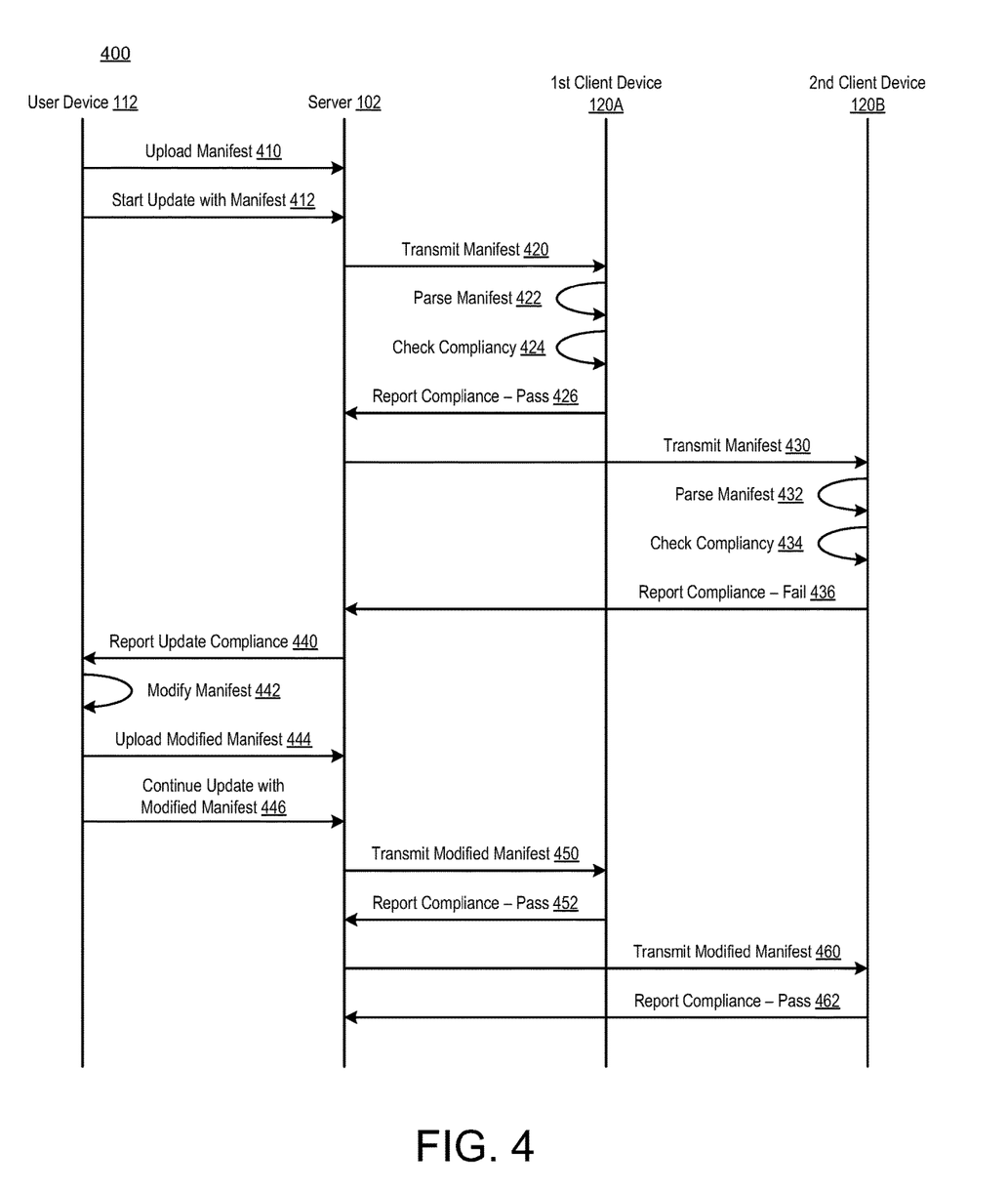
FIG. 4 illustrates a process flow diagram of a method for manifest trialing in accordance with implementations described herein.

FIG. 4 illustrates a process/signal flow diagram of a method 400 for manifest trialing in accordance with implementations described herein.

It should be understood that even though method 400 may indicate a particular order of operation execution, in some cases, various certain portions of operations may be executed in a different order, and on different systems. In some other cases, additional operations and/or steps may be added to and/or omitted from method 400. Method 400 may be implemented in hardware and/or software. If implemented in hardware, method 400 may be implemented with various components, such as described herein above in reference to FIGS. 1-3. If implemented in software, method 400 may be implemented as a program or software instruction process that may be configured for implementing manifest trialing schemes and techniques as described herein. Further, if implemented in software, various instructions related to implementing method 400 may be stored in memory, wherein a computer, a server, or various other computing type devices having a processor and memory may be configured to perform method 400.

In reference to FIG. 4, method 400 may be utilized for implementing various manifest trialing schemes and techniques as described herein. For instance, as shown in FIG. 4, the method 400 may be used by the system 100 with the server 102 or similar apparatus in communication with the user device 112 and the plurality of client devices, such as, e.g., the first client device 120A and the second client device 120B via the cloud 110 or similar network. The server 102 may be configured for deployment of an update (e.g., software update) to the plurality of client devices 120A, 120B, 120C, ..., 120N. The update may be provided by the user device 112 to the server 102 for distribution to the client devices 120A, 120B by the server 102. The server 102 communicates with the user device 112 and the client devices 120A, 120B, which may refer to a fleet of remote devices that are separate and disposed away from the server 102.

At operation 410, the user device 112 may upload and provide a manifest (as a first manifest) to the server 102, and at operation 412, the user device 112 may start an update with the manifest. At operation 420, the server 102 may transmit and provide the manifest (as a first manifest) to the first client device 120A. At operation 422, the first client device 120A may parse the manifest, and at operation 424, the first client device 120A may check compliancy of the manifest. At operation 426, the first client device 120A may report compliance as feedback to the server 102, and in this instance, the first client device 120A may report compliance as passing. At operation 430, the server 102 may transmit and provide the manifest (as the first manifest) to the second client device 120B. At operation 432, the second client device 120B may parse the manifest, and at operation 434, the second client device 120B may check compliancy of the manifest. At operation 436, the second client device 120B may report compliance as feedback to the server 102, and in this instance, the second client device 120B may report compliance as failing. As such, the client devices 120A, 120B may report passing compliance or failing compliance to the server 102 as a feedback response to the manifest (as a first manifest).

At operation 440, the server 102 may determine update compliance based on the compliance reports received from the client devices 120A, 120B, and then report the update compliance to the user device 112. In some cases, the update compliance may also refer to determining an update compliance rate based on the compliance reports received from the client devices 120A, 120B. In this instance, at operation 442, the user device 112 may modify parameters of the first manifest so as to generate or acquire a modified manifest (as a second manifest) having modified parameters associated with the first manifest so as to increase the update deployment rate. At operation 444, the user device 112 may upload and provide the modified manifest (as a second manifest) to the server 102 for distribution to the client devices 120A, 120B. In this instance, at operation 446, the user device 112 may continue the update (e.g., continue the software update) with the modified manifest (as a second manifest).

At operation 450, the server 102 may transmit and provide the modified manifest to the first client device 120A, and at operation 452, the first client device 120A may parse the modified manifest, check for compliance of the modified manifest, and then report compliance of the modified manifest as feedback to the server 102. In this instance, the first client device 120A may report compliance as a passing compliance. Also, at operation 460, the server 102 may transmit and provide the modified manifest to the second client device 120B, and at operation 462, the second client device 120B may parse the modified manifest, check for compliance of the modified manifest, and then report compliance of the modified manifest as feedback to the server 102. In this instance, the second client device 120B may report compliance as a passing compliance. As such, the client devices 120A, 120B may both report passing compliance of the modified manifest to the server 102 as a feedback response to the modified manifest (as a second manifest having modified parameters associated with the first manifest).

In reference to FIG. 4, various different scenarios, results, and outcomes may be achieved with the manifest trialing schemes and techniques described herein.

In some scenarios, the client devices 120A, 120B may receive a first manifest from the server 102, and the first manifest may include a trial flag with a first status indicator. The client devices 120A, 120B may parse the first manifest to extract the trial flag and to determine a state of the first status indicator, and the state may refer to a first state or a second state. If the first status indicator of the trial flag is in the first state, then the client devices 120A, 120B may install the manifest and/or upload and install the update. Otherwise, if the first status indicator of the trial flag is in the second state, then the client devices 120A, 120B may generate an update acceptability report and provide the update acceptability report to the server 102.

In some instances, the manifest is a first manifest having the trial flag as a first trial flag with the first status indicator, and the update acceptability report is a first update acceptability report. In this instance, the client devices 120A, 120B may receive a second manifest (or modified manifest) from the server 102, and the second manifest may include a second trial flag with a second status indicator. Also, in this instance, the client devices 120A, 120B may parse the second manifest (or modified manifest) to extract the second trial flag and to determine a state of the second status indicator, wherein the state refers to the first state or the second state. If the second status indicator of the second trial flag is in the first state, then the client devices 120A, 120B may install the second manifest and/or upload and install the update (e.g., software update) in accordance with modified parameters of the second manifest (as a modified manifest). Otherwise, if the second status indicator of the second trial flag is in the second state, then the client devices 120A, 120B may generate a second update acceptability report and provide the second update acceptability report to the server 102.

In some instances, the client devices 120A, 120B may store the first manifest in memory, and if the second status indicator of the second trial flag is in the second state, then the client devices 120A, 120B may retrieve the first manifest from the memory and install the first manifest and/or download and install the update that is associated with the first manifest. The first manifest and the second manifest are digital content manifests, and the first trial flag and the second trial flag are trialing parameters that are set with the first status indicator and the second status indicator, respectively. The first manifest and the second manifest have digital security mechanisms that are used to authenticate the first manifest and the second manifest, respectively. The first update acceptability report and the second update acceptability report refer to one or more compatibility checks, and the first update acceptability report and the second update acceptability report include compatibility results that refer to a level of update compliance and update compatibility. Also, the first update acceptability report and the second update acceptability report refer to a level of update compliance related to acceptance (e.g., passing compliance) or failure (e.g., failing compliance) of installing the first manifest or the second manifest.

In other scenarios, the client devices 120A, 120B may receive a first manifest from the server 102, and the first manifest may include a first trial flag with a first status indicator. The client devices 120A, 120B may parse the first manifest to extract the first trial flag and to determine a state of the first status indicator, and the state may refer to a first state or a second state. If the first status indicator of the first trial flag is in the first state, then the client devices 120A, 120B may install the first manifest and/or download and install the update that is associated with the first manifest. Otherwise, if the first status indicator of the first trial flag is in the second state, then the client devices 120A, 120B may store the first manifest in memory and then wait to receive a second manifest, which may have modified parameters associated with the first manifest.

In some instances, the client devices 120A, 120B may receive the second manifest from the server, and the second manifest may have a second trial flag with a second status indicator. In this instance, the client devices 120A, 120B may then parse the second manifest to extract the second trial flag and to determine a state of the second status indicator, and the state refers to the first state or the second state. If the second status indicator of the second trial flag is in the first state, then the client devices 120A, 120B may retrieve the first manifest from the memory and install the first manifest and/or upload and install the update that is associated with the first manifest. Otherwise, if the second status indicator of the second trial flag is in the second state, then the client devices 120A, 120B may install the second manifest and/or upload and install the update that is associated with the second manifest.

Therefore, in various implementations, there are a few different ways in which the client device is instructed to execute an update in accordance with a manifest. For instance, the client device may be sent a second manifest with the trial flag not set or the client device may retain (or store) the first (or original) manifest and wait for an effective (cryptographically secure) "go" command to execute the stored manifest. Sometimes, the decision to alter (or modify) the first (or original) manifest to thereby increase the update deployment rate may have user interaction involved (e.g., it may not be automatically set based on a specific threshold, and the decision as to what to alter or modify may also not be automatic). In other instances, the client device may trial the manifest for the update and report back as to whether or not a particular update can be performed. Also, once the update deployment rate is known, then information related to deploying the update based on the update deployment rate may be achieved in a particular manner.

In some implementations, the digital security mechanism may refer to capability of the client devices 120A, 120B, 120C, . . . , 120N to authenticate a manifest that is signed with public key cryptography, which may be expensive for devices to validate. This means that a goal is to minimize operations that need public-key-based validation, and manifest trialing provides for ways to trigger an update once the trial is done. In a first option, the server 102 may send another manifest without the trial flag set, and in a second option, the server 102 may send a non-manifest message to authorize the manifest. An issue with the first option is that it may require another public key operation, and an issue with the second option is that an attacker can fake this message. To solve these issues, the manifest may be designed with a lightweight means for the manifest author to inform a client device that it can proceed with the installation of a trial manifest.

In some instances, the manifest author may create an installation authorization token that places information in the manifest to authenticate the token with a lightweight primitive. The installation authorization token may be constructed using a combination of a single-use secret with some metadata. Authentication of that token may be achieved via a simple message digest of the token, and the digest of the token does not reveal the token. However, if the client device receives a token, then the client device may verify the token against the digest in the trial manifest.

Figure 5:
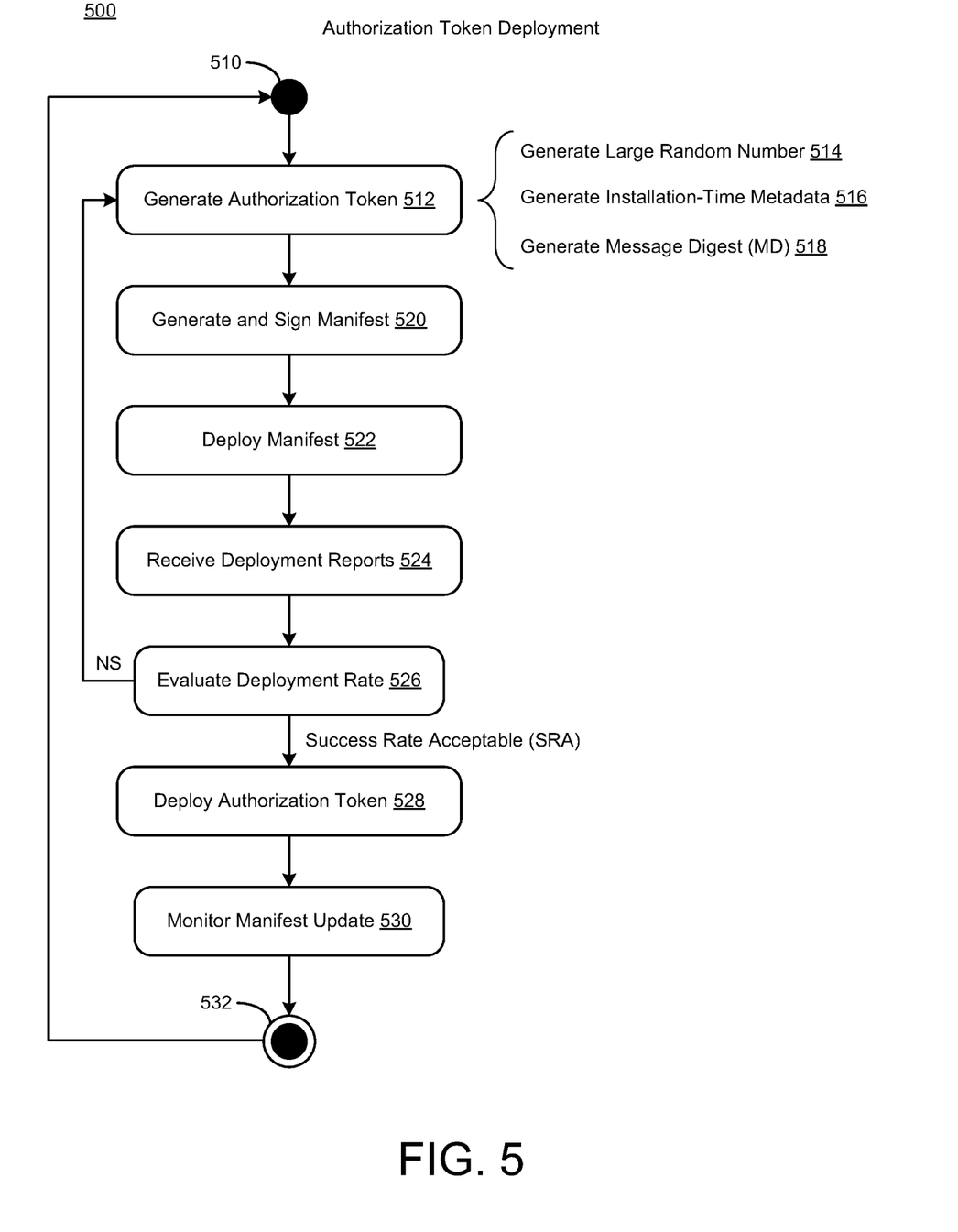
FIG. 5 illustrates a process flow diagram of a method for distributing an authorization token in accordance with implementations described herein.

FIG. 5 illustrates a process flow diagram of a method 500 for distributing an authorization token in accordance with implementations described herein.

It should be understood that even though method 500 may indicate a particular order of operation execution, in some cases, various certain portions of operations may be executed in a different order, and on different systems. In some other cases, additional operations and/or steps may be added to and/or omitted from method 500. Method 500 may be implemented in hardware and/or software. If implemented in hardware, method 500 may be implemented with various components, such as described herein above in reference to FIG. 1. If implemented in software, method 500 may be implemented as a program or software instruction process that may be configured for implementing various authorization token distribution schemes and techniques as described herein. Further, if implemented in software, various instructions related to implementing method 500 may be stored in memory, wherein a computer, a server, or various other computing devices having a processor and memory may be configured to perform method 500.

In reference to FIG. 5, method 500 may be utilized for implementing various authorization token distribution schemes and techniques. In some implementations, method 500 may be performed by a server (e.g., server 102 of FIG. 1) having capability to communicate with a user device (e.g., user device 112 in FIG. 1) and one or more remote devices (e.g., client devices 120A, 120B, 120C, . . . , 120N in FIG. 1), and method 500 may also be used for distribution of an authorization token from the server that may be referred to as a cloud server.

From initial block 510, method 500 may proceed to block 512, wherein method 500 may generate an authorization token, which may be referred to as an authentication token. In reference to the digital security mechanism, the manifest author (e.g., a user of the user device 112 or the server 102 in FIG. 1) may generate or create an authorization token by creating a large random number (a nonce) 514, creating any installation-time metadata that a client device may need 516, and creating a message digest (MD) [nonce, metadata] 518. In block 520, method 500 may generate and sign the manifest, wherein the manifest author may create a manifest, with the trial flag set, that includes the message digest (MD) having [nonce, metadata]), and the manifest author may sign the manifest. In block 522, method 500 may deploy the manifest, wherein the manifest author may send the manifest to a deployment service, and the deployment service may send out a trial manifest to one or more or a fleet of client devices. In block 524, method 500 may receive deployment reports from the client devices, wherein the client devices may authenticate and trial the manifest, then the client devices may report success or failure back to the deployment service. In block 526, method 500 may evaluate a deployment rate, wherein the manifest author may evaluate a success rate of deploying the manifest to the client device(s). In this instance, if the success rate is not high enough (NS), then the manifest author updates campaign parameters, and method 500 may return to block 512. If the success rate is acceptable (SRA), then in block 528, method 500 may deploy the authorization token, wherein the manifest author sends the installation authorization token to the client device (e.g., via a deployment service). In block 530, method 500 may monitor progress of the manifest update in the client device(s). For instance, the client device(s) may receive the authorization token from the deployment service, and then the client device(s) may validate the authorization token by calculating the message digest MD (e.g., from the authorization token). Then, the client device(s) may compare the calculated authorization token to the message digest MD ([nonce, metadata]) that existed in the manifest, and if there is a match, then the client device(s) may install the update described in the manifest. Once the update is performed by the client device(s), method 500 may proceed to ending block 532 to either terminate the process flow or generate another authorization token.

In other instances, there are a few other ways that could be used to implement the token securely. The key point may be that the manifest author keeps the token secret, and once it is revealed, any device that receives the token will believe that it is authorized to install an update. In some instances, a token could leak from one network, where an update has been authorized, to another network where it has not been authorized.

This consideration may be mitigated as well. For instance, when devices are managed by more than one party, more than one signature may be required to authorize an update. For instance, it may be important for network operators to authorize firmware updates even if the client devices on their network do not completely trust them (e.g., when the firmware vendor is not the network operator) because this allows them to manage compatibility between client devices. In some cases, these multiple signatures are divided into multiple manifests, with one part having a dependency on the other part. As such, in this instance, only the network operator's manifest may have the trial flag set and also the token verification code. Then, it is the network operator who authorizes installation of the update, so there is less danger of a token leaking from one network to another.

Some advantages associated with utilizing various manifest trialing schemes and techniques described herein may include one or more of the following. The manifest trialing enables owners and/or operators of IoT devices to run and execute fewer update campaigns and save costs on such endeavors. The manifest trialing improves the quality and applicability of updates and manifests for IoT devices on single updates as well as enabling improvements of the updates' quality over the course of time. Also, the manifest trialing is based on a previous point that enables improved reach of updates on the fleet of client devices to help ensure that more client devices have up-to-date software and are less prone to malicious attacks due to older software. The manifest trialing reduces network bandwidth that is used in case that it is possible to avoid downloading an update payload to client devices for which manifest trialing may detect that the update payload cannot be successfully applied in its fullness.

Figure 6:
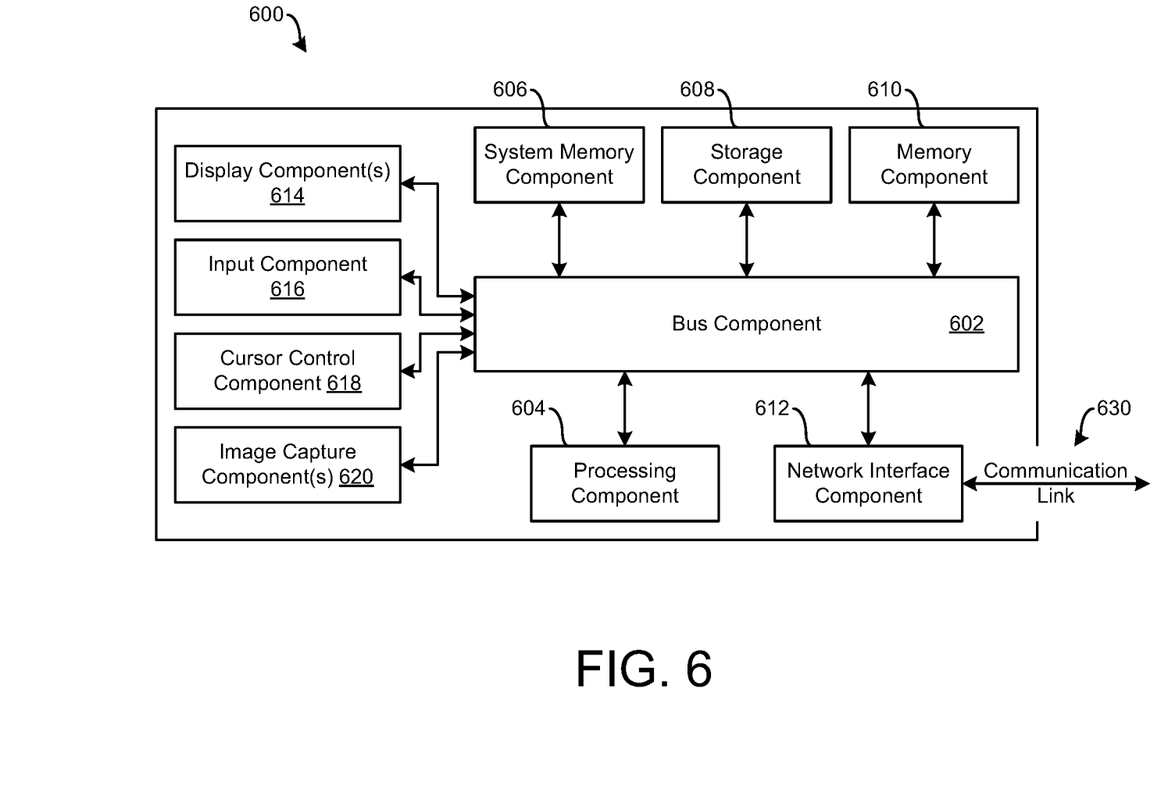
FIG. 6 illustrates a block diagram of a computing device in accordance with various implementations described herein.

FIG. 6 is a block diagram of a computing device 600 suitable for implementing various implementations described herein, including, e.g., the server 102, the user device 112, and the client devices 120A, 120B, 120C, . . . , 120N along with various components associated therewith in FIGS. 1-4. Thus, in this instance, the computing device 600 may be embodied as one or more of the server 102, the user device 112, and the client devices 120A, 120B, 120C, . . . , 120N, which may be configured for network communication with various other computing devices over a wired or wireless network, such as, e.g., the cloud 110 in FIG. 1, or similar network.

The computer device 600 may be implemented as various types of computing devices, such as, e.g., a server, a personal computer (PC), a laptop, a notebook, a mobile communication device, or similar. The computer device 600 may include a bus 602 (or other communication mechanism for communicating information) that interconnects the various subsystems and/or components, such as, e.g., processing component 604 (e.g., processor, digital signal processor (DSP), etc.), system memory component 606 (e.g., RAM), static storage component 608 (e.g., ROM), disk drive component 610 (e.g., magnetic or optical), network interface component 612 (e.g., modem or Ethernet card), display component 614 (e.g., CRT or LCD), input component 616 (e.g., keyboard), cursor control component 618 (e.g., mouse or trackball), and image capture component 620 (e.g., analog or digital camera). In some implementations, disk drive component 610 may comprise a database having one or more disk drive components.

The computer device 600 performs various specific operations by processor 604 executing one or more sequences of one or more instructions contained in system memory component 606. Such instructions may be read into system memory component 606 from another computer readable medium, such as static storage component 608 or disk drive component 610. In some cases, hard-wired circuitry may be used in place of or in combination with software instructions to implement the various schemes and/or techniques described herein.

Logic may be encoded in a computer readable medium, which may refer to any medium that participates in providing instructions to processor 604 for execution. Such a medium may take many forms, including but not limited to, non-volatile media and volatile media. In various implementations, non-volatile media includes optical or magnetic disks, such as disk drive component 610, and volatile media includes dynamic memory, such as system memory component 606. In some implementations, data and information related to execution instructions may be transmitted to computer device 600 via a transmission media, such as in the form of acoustic or light waves, including those generated during radio wave and infrared data communications. In various implementations, transmission media may include coaxial cables, copper wire, and/or fiber optics, including wires that comprise bus 602.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various implementations, execution of instruction sequences to practice the schemes and techniques described herein may be performed by computer device 600. In other implementations described herein, a plurality of computer systems 600 coupled by communication link 630 (e.g., LAN, WLAN, PTSN, and/or various other wired or wireless networks, including telecommunications, mobile, and/or cellular phone networks) may perform instruction sequences to practice implementations of the present disclosure in coordination with one another.

In various implementations, the computer device 600 may transmit and receive messages, data, information and instructions, including programs (i.e., application code) through communication link 630 and communication interface 612. Further, the received program code may be executed by the processor 604 as received and/or stored in disk drive component 610 or some other non-volatile storage component for execution.

Described herein are various implementations of a method. The method may include acquiring a manifest having a trial flag with a status indicator and providing the manifest to a plurality of devices. The status indicator may inform the plurality of devices to provide update acceptability reports. The method may include receiving the update acceptability reports from the plurality of devices and determining an update deployment rate based on the update acceptability reports received from the plurality of device. The method may include deploying the update in accordance with the update deployment rate.

Described herein are various implementations of a method for processing a manifest. The method may include receiving a manifest from a server, and the manifest includes a trial flag with a status indicator. The method may include parsing the manifest to extract the trial flag and to determine a state of the status indicator, and the state refers to a first state or a second state. If the status indicator of the trial flag is in the first state, then the method may include installing the manifest. If the status indicator of the trial flag is in the second state, then the method may include generating an update acceptability report and providing the update acceptability report to the server.

Described herein are various implementations of a method. The method may include receiving a first manifest from a server, and the first manifest includes a first trial flag with a first status indicator. The method may include parsing the first manifest to extract the first trial flag and to determine a state of the first status indicator, and the state refers to a first state or a second state. If the first status indicator of the first trial flag is in the first state, then the method may include installing the first manifest. If the first status indicator of the first trial flag is in the second state, then the method may include storing the first manifest in memory and waiting to receive a second manifest.

Implementations of various technologies described herein may be operational with numerous general purpose or special purpose computing system environments or configurations. Examples of computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCs, minicomputers, mainframe computers, smart phones, tablets, wearable computers, cloud computing systems, virtual computers, marine electronics devices, and the like.

The various technologies described herein may be implemented in the general context of computer-executable instructions, such as program modules, being executed by a computer. Program modules include routines, programs, objects, components, data structures, etc. that perform particular tasks or implement particular abstract data types. Further, each program module may be implemented in its own way, and all need not be implemented the same way. While program modules may execute on a single computing system, it should be appreciated that, in some implementations, program modules may be implemented on separate computing systems or devices adapted to communicate with one another. A program module may also be some combination of hardware and software where particular tasks performed by the program module may be done either through hardware, software, or some combination of both.

The various technologies described herein may be implemented in distributed computing environments where tasks are performed by remote processing devices that are linked through a communications network, e.g., by hardwired links, wireless links, or various combinations thereof. In a distributed computing environment, program modules may be located in both local and remote computer storage media including, for example, memory storage devices and similar.

Further, the discussion provided herein may be considered directed to certain specific implementations. It should be understood that the discussion provided herein is provided for the purpose of enabling a person with ordinary skill in the art to make and use any subject matter defined herein by the subject matter of the claims.

It should be intended that the subject matter of the claims not be limited to the implementations and illustrations provided herein, but include modified forms of those implementations including portions of implementations and combinations of elements of different implementations in accordance with the claims. It should be appreciated that in the development of any such implementation, as in any engineering or design project, numerous implementation-specific decisions should be made to achieve developers' specific goals, such as compliance with system-related and business related constraints, which may vary from one implementation to another. Moreover, it should be appreciated that such a development effort may be complex and time consuming, but would nevertheless be a routine undertaking of design, fabrication, and manufacture for those of ordinary skill having benefit of this disclosure.

Reference has been made in detail to various implementations, examples of which are illustrated in the accompanying drawings and figures. In the following detailed description, numerous specific details are set forth to provide a thorough understanding of the disclosure provided herein. However, the disclosure provided herein may be practiced without these specific details. In some other instances, well-known methods, procedures, components, circuits and networks have not been described in detail so as not to unnecessarily obscure details of the embodiments.

It should also be understood that, although the terms first, second, etc. may be used herein to describe various elements, these elements should not be limited by these terms. These terms are only used to distinguish one element from another. For example, a first element could be termed a second element, and, similarly, a second element could be termed a first element. The first element and the second element are both elements, respectively, but they are not to be considered the same element.

The terminology used in the description of the disclosure provided herein is for the purpose of describing particular implementations and is not intended to limit the disclosure provided herein. As used in the description of the disclosure provided herein and appended claims, the singular forms "a," "an," and "the" are intended to include the plural forms as well, unless the context clearly indicates otherwise. The term "and/or" as used herein refers to and encompasses any and all possible combinations of one or more of the associated listed items. The terms "includes," "including," "comprises," and/or "comprising," when used in this specification, specify a presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. The terms "up" and "down"; "upper" and "lower"; "upwardly" and "downwardly"; "below" and "above"; and other similar terms indicating relative positions above or below a given point or element may be used in connection with some implementations of various technologies described herein.

While the foregoing is directed to implementations of various techniques described herein, other and further implementations may be devised in accordance with the disclosure herein, which may be determined by the claims that follow.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for deployment of an update to a plurality of devices, comprising:
    acquiring a manifest having a trial flag with a status indicator;
    providing the manifest to a plurality of devices, wherein the status indicator informs the plurality of devices to provide update acceptability reports;
    receiving the update acceptability reports from the plurality of devices;
    determining an update deployment rate based on the update acceptability reports received from the plurality of devices; and
    deploying the update in accordance with the update deployment rate.

2. The method of claim 1, wherein the manifest is a first manifest having the trial flag with the status indicator as a first status indicator, the method further comprising:
    if the update deployment rate is greater than or equal to a threshold, then:
        providing the first manifest having the trial flag with a second status indicator that informs the plurality of devices to install the first manifest; and
    if the update deployment rate is less than the threshold, then:
        acquiring a second manifest having modified parameters associated with the first manifest so as to increase the update deployment rate, and
        providing the second manifest to the plurality of devices, wherein the second manifest has the trial flag with the second status indicator that informs the plurality of devices to install the second manifest.

3. The method of claim 2, wherein the first manifest and the second manifest are universal update files for installation on the plurality of devices.

4. The method of claim 2, wherein the first manifest and the second manifest are digital content manifests, and wherein the trial flag is a trialing parameter that is set with the first status indicator or the second status indicator.

5. The method of claim 2, wherein the first manifest and the second manifest have a digital security mechanism used by the plurality of devices to authenticate the first manifest and the second manifest.

6. The method of claim 2, wherein the trial flag informs the plurality of devices to install the first manifest or the second manifest based on the first status indicator or the second status indicator, and wherein the second status indicator is different than the first status indicator.

7. The method of claim 2, wherein the update deployment rate refers to a level of update compliance from the plurality of devices, and wherein the level of compliance refers to feedback responses related to acceptance or failure of installing the first manifest or the second manifest by the plurality of devices.

8. The method of claim 1, wherein the update acceptability reports refer to one or more compatibility checks performed by the plurality of devices, and wherein the update acceptability reports include compatibility results that refer to a level of update compliance and update compatibility from the plurality of devices.

9. The method of claim 1, wherein the method is performed by a server having capability to communicate with the plurality of devices, and wherein the plurality of devices comprises a fleet of remote devices.

* * * * *